United States Patent
Hodgson et al.

(10) Patent No.: US 9,188,833 B2
(45) Date of Patent: *Nov. 17, 2015

(54) OPTICAL PARAMETRIC OSCILLATOR PUMPED BY FEMTOSECOND THIN-DISK LASER

(75) Inventors: Norman Hodgson, Belmont, CA (US); Dmitri Simanovski, Palo Alto, CA (US); Andrei Starodoumov, Campbell, CA (US)

(73) Assignee: Coherent, Inc., Santa Clara, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 13/984,518

(22) PCT Filed: Feb. 1, 2012

(86) PCT No.: PCT/US2012/023456
§ 371 (c)(1),
(2), (4) Date: Sep. 10, 2013

(87) PCT Pub. No.: WO2012/109066
PCT Pub. Date: Aug. 16, 2012

(65) Prior Publication Data
US 2014/0009821 A1  Jan. 9, 2014

Related U.S. Application Data

(63) Continuation of application No. 13/023,280, filed on Feb. 8, 2011, now Pat. No. 8,477,410.

(51) Int. Cl.
*G02F 1/39* (2006.01)
*H01S 3/10* (2006.01)
*G02F 1/35* (2006.01)
*H01S 3/00* (2006.01)
*H01S 3/06* (2006.01)
*H01S 3/08* (2006.01)
(Continued)

(52) U.S. Cl.
CPC ............ *G02F 1/3532* (2013.01); *H01S 3/0057* (2013.01); *H01S 3/0092* (2013.01); *G02F 2001/3507* (2013.01); *G02F 2001/3542* (2013.01); *G02F 2001/392* (2013.01); *H01S 3/0604* (2013.01); *H01S 3/0805* (2013.01); *H01S 3/0815* (2013.01); *H01S 3/0817* (2013.01); *H01S 3/1112* (2013.01); *H01S 3/1118* (2013.01)

(58) Field of Classification Search
None
See application file for complete search history.

(56) References Cited

U.S. PATENT DOCUMENTS 5,079,772 A   1/1992 Negus et al.
5,163,059 A  11/1992 Negus et al.
(Continued)

OTHER PUBLICATIONS

Non Final Office Action received for U.S. Appl. No. 13/023,280, mailed on Jan. 23, 2013, 10 pages.
(Continued)

*Primary Examiner* — Hemang Sanghavi
(74) *Attorney, Agent, or Firm* — Morrison & Foerster LLP

(57) ABSTRACT

Pulses from a mode-locked Yb-doped laser (12) are spectrally broadened in an optical fiber (28), and temporally compressed in a grating compressor (32), then frequency-doubled (34) and used to pump an optical parametric oscillator (OPO) (40). The OPO output is tunable over a wavelength range from about 600 nm to about 1100 nm. Mode-locking in the Yb-doped laser (12) is accomplished with a SESAM (14) or by Kerr-lens mode-locking with a Kerr medium (82) and a hard aperture (84).

12 Claims, 4 Drawing Sheets

(51) Int. Cl.
*H01S 3/081* (2006.01)
*H01S 3/11* (2006.01)

(56) References Cited

U.S. PATENT DOCUMENTS

| | | | |
|---|---|---|---|
| 5,553,088 A | 9/1996 | Brauch et al. | |
| 6,363,090 B1 | 3/2002 | Wintner et al. | |
| 6,590,911 B1 | 7/2003 | Spinelli et al. | |
| 6,778,580 B2 | 8/2004 | Erhard et al. | |
| 6,834,064 B1 | 12/2004 | Paschotta et al. | |
| 7,254,153 B2 | 8/2007 | Butterworth et al. | |
| 7,447,245 B2 | 11/2008 | Caprara et al. | |
| 7,898,731 B2 | 3/2011 | Sharping et al. | |
| 7,991,026 B2 | 8/2011 | Caprara | |
| 8,477,410 B2* | 7/2013 | Hodgson et al. | 359/330 |
| 2004/0095634 A1 | 5/2004 | Paschotta et al. | |
| 2007/0013995 A1* | 1/2007 | Kaertner et al. | 359/330 |
| 2011/0273763 A1 | 11/2011 | Kaertner et al. | |
| 2012/0217375 A1* | 8/2012 | Lin | 250/208.1 |

OTHER PUBLICATIONS

Notice of Allowance received for U.S. Appl. No. 13/023,280, mailed on May 6, 2013, 9 pages.

International Search Report and Written Opinion received for PCT Patent Application No. PCT/US2012/023456, mailed on May 8, 2012, 14 pages.

Agrawal G. P., "Nonlinear Fiber Optics (2nd Edition—Copyright 1995 by Academic Press, Inc.)", Chapters 6.3 through 6.3.2, 11 pages.

Baer et al., "227-fs Pulses from a Mode-Locked Yb:LuScO3 Thin Disk Laser", Optics Express, vol. 17, No. 13, Jun. 22, 2009, pp. 10725-10730.

Brunner et al., "Diode-Pumped Femtosecond Yb:KGd(WO4)2 Laser with 1.1-W Average Power", Optics Letters, 25, No. 15., Aug. 1, 2000, pp. 1119-1121.

Brunner et al., "Passively Mode-Locked High-Power Lasers and Femtosecond High-Power Nonlinear Frequency Conversion", Proceedings of SPIE, vol. 5478, 2004, pp. 1-3.

Chambaret et al., "Generation of 25-TW, 32-fs Pulses at 10 Hz", Optics Letters, vol. 21, No. 23, Dec. 1, 1996, pp, 1921-1923.

Chen et al., "Chirally-Coupled-Core Vb-fiber Laser Delivering 80-fs Pulses with Diffraction-Limited Beam Quality Warranted by a High-Dispersion Mirror Based Compressor", Optics Express, vol. 18, No. 24, Nov. 22, 2010, pp. 24699-24705.

Druon et al., "High-Repetition-Rate 300-ps Pulsed Ultraviolet Source with a Passively Q-Switched Microchip Laser and a Multipass Amplifier", Optics Letters, vol. 24, No. 7, Apr. 1, 1999, pp. 499-501.

Friebel et al., "Diode-Pumped 99 fs Yb:CaF2 Oscillator", Optics Letters , vol. 34, No. 9, May 1, 2009, pp. 1474-1476.

Lefrancois et al., "Scaling of Dissipative Soliton Fiber Lasers to Megawatt Peak Powers by use of Large-Area Photonic Crystal Fiber, Optics Letters, vol. 35, No. 1 0, May 15, 2010, pp. 1569-1571.

Marchese et al., "Efficient Femtosecond High Power Yb:Lu203 Thin Disk Kaser", Optics Express, vol. 15, No. 25, Dec. 10, 2007, pp. 16966-16971.

O'Connor et al., "Fibre-Laser-Pumped Femtosecond PPLN Optical Parametric Oscillator", IEEE, vol. 2, 2001, pp. 756-757.

Olson et al., "Multipass Diode-Pumped Nd:YAG Optical Amplifiers At 1.06 mum and 1.32 mum", IEEE Photonics Technology Letters, No. 5, May 6, 1994, pp. 605-608.

Tokurakawa et al., "Diode-Pumped 65 fs Kerr-Lens Mode-Locked Yb3+:Lu2O3 and Nondoped Y2O3 Combined Ceramic Laser", Optics Letters, vol. 33, No. 12, Jun. 15, 2008, pp. 1380-1382.

\* cited by examiner

OPTICAL PARAMETRIC OSCILLATOR PUMPED BY FEMTOSECOND THIN-DISK LASER

CROSS REFERENCED TO RELATED APPLICATIONS

This application is a U.S. National Phase patent application of PCT/US2012/023456, filed Feb. 1, 2012, which claims priority to U.S. patent application Ser. No. 13/023,280, filed Feb. 8, 2011, all of which are hereby incorporated by reference in the present disclosure in their entirety.

TECHNICAL FIELD OF THE INVENTION

The present invention relates in general to lasers delivering pulsed radiation at pulse widths of less than about 300 femtoseconds and greater than 10 MHz repetition rates. The invention relates in particular to optical parametric oscillators pumped by such lasers.

DISCUSSION OF BACKGROUND ART

Multi-photon excitation using ultrafast lasers is a common technique for generating 3D images of biological tissue with a spatial resolution in the sub-micron range. A usual laser source for this application is a tunable Ken-lens mode-locked Ti:Sapphire laser with an average output power between 1 and 3 Watts (W) at a pulse-repetition frequency (PRF) of about 80 Megahertz (MHz) and a pulse duration between about 70 and 140 femtoseconds (fs). The typical tuning range of such a laser covers a wavelength range between about 680 nanometers (nm) and about 1080 nm. Extension of the tuning range into the infrared (up to 2 um) can be accomplished by using the output of the laser to pump an external optical parametric oscillator (OPO).

One significant disadvantage of a Ti-Sapphire laser is that it must be pumped at a wavelength of 532 nm using a frequency doubled diode-pumped solid-state (DPSS) laser with an output power in a range between about 5 W and 20 W to generate the gain in the Ti:Sapphire gain-medium of the laser and to achieve an output power of greater 1 W. Such a frequency-doubled DPSS laser is relatively expensive, and can have a cost comparable to the Ti:Sapphire resonator.

There is a need for a more cost effective ultrafast laser source that is tunable over several hundred nm in the visible and infrared (IR) and can deliver pulses having a duration of 100 fs or shorter. One possible approach is to use a laser having a gain-medium that has a wide gain-bandwidth, for example 10 nm or greater that can be pumped by standard diode-lasers and is power-scalable to several Watts of output power. Ytterbium (Yb) doped gain-media in bulk or fiber form meet these requirements. However, while output powers exceeding 100 W range have been achieved with 9XX-nm diode-pumped mode-locked Yb-doped fiber MOPAs (master-oscillator power-amplifiers) and Yb-doped solid state thin-disk lasers, it is technically difficult to achieve sub-100 fs pulse durations at 80 MHz PRF at these power levels.

FIG. 1 is a plot summarizing published average-power and pulse-duration results for mode-locked lasers including various bulk Yb-doped gain-media. Results for media in disk form are indicated by a letter D beside symbols identifying the gain-media. Yb-doped yttrium aluminum garnet (Yb:YAG), yttrium-doped potassium gadolinium tungstate (Yb:KGW), yttrium-doped potassium yttrium tungstate (Yb:KYW), yttrium-doped potassium lutetium tungstate (Yb:KLuW), yttrium-doped lutetium oxide (Yb:Lu$_2$O$_3$), and yttrium-doped lutetium scandium sesquioxide (Yb:LuScO$_3$). Other less commonly used materials are collectively summarized under the symbol for Yb:XXX. Pulse repetition frequencies of the examples are in a range between about 60 and 100 MHz. It can be seen from the plot that the gain-media in thin-disk form provide the highest powers, but, in general, it can be seen that whatever the form of the gain-medium, higher power is accompanied by longer pulse-duration.

Pulses having a duration of less than 100 fs have been demonstrated using mode-locked Yb-doped fiber ring-lasers. However, these fiber ring-lasers use nonlinear polarization rotation as the mode-locking mechanism, and this mechanism is very sensitive to environmental changes and is not suitable for lasers which will be used in a commercial environment. Yb Fiber MOPAs and oscillators have also achieved sub 100 fs pulse durations, but due to strong nonlinear effects in the fiber amplifiers, the pulse shapes of these lasers usually comprise undesirable sidelobes.

In order to provide a cost effective tunable ultrafast laser it will be necessary to overcome above discussed scaling problems of mode-locked Yb-doped laser sources.

SUMMARY OF THE INVENTION

In one aspect, laser apparatus in accordance with the present invention comprises a mode-locked laser including a ytterbium-doped solid state gain-medium. The mode-locked laser is arranged to deliver mode-locked laser-radiation pulses having a fundamental wavelength, a first spectral bandwidth, and a first pulse-duration. A passive medium is arranged to receive the mode-locked pulses from the mode-locked laser and broaden the spectral bandwidth of the pulses to a second spectral bandwidth. A pulse compressor is provided for compressing the duration of the bandwidth-broadened pulses to a second duration shorter than the first duration. A first optically nonlinear crystal is arranged to frequency-double the fundamental wavelength of the compressed pulses to provide frequency-doubled pump-pulses having a wavelength one-half that of the fundamental wavelength. An optical parametric oscillator is arranged to be optically pumped by the frequency-doubled pump-pulses. The optical parametric oscillator has a resonator including a second optically nonlinear crystal arranged to frequency-convert the frequency-doubled pump-pulses to signal-pulses having a wavelength longer than that of the frequency-doubled pump-pulses and tunable within a predetermined range.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
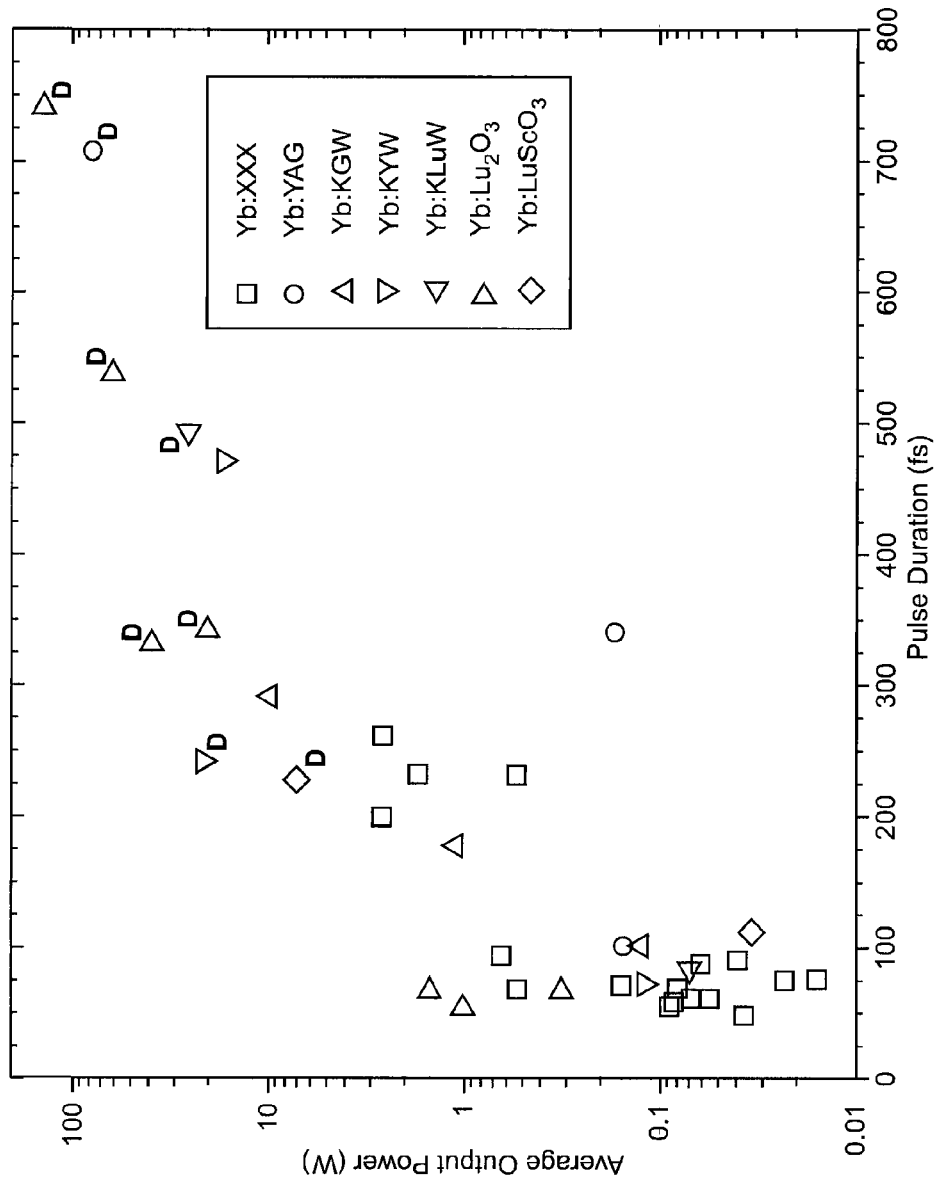
FIG. 1 is a plot schematically illustrating a relationship between power output and pulse duration in prior-art mode-locked lasers based various ytterbium-doped solid-state gain-media.
Figure 2:
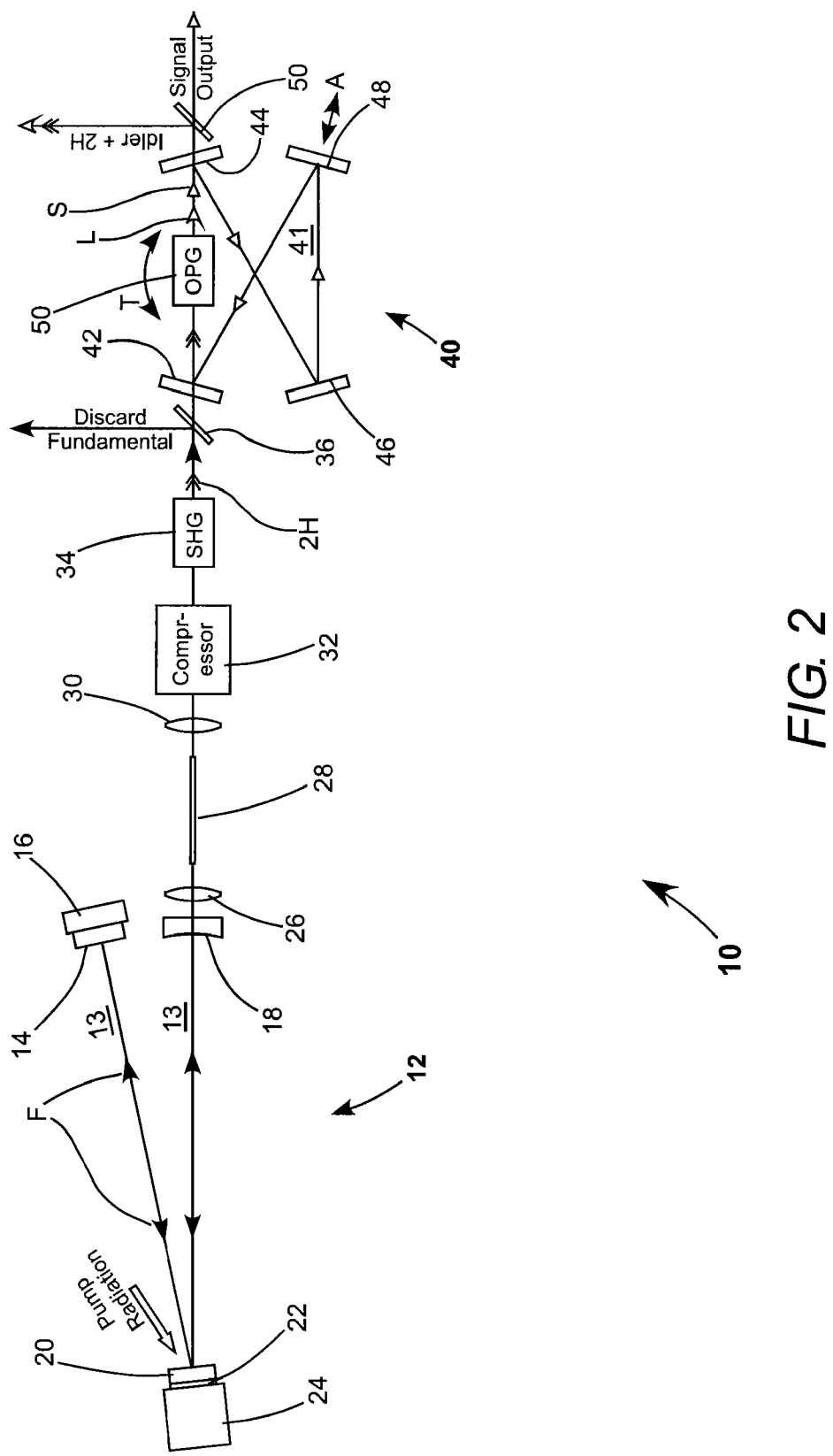
FIG. 2 schematically illustrates one preferred embodiment of an ultrafast laser in accordance with the present invention, including a pulsed Yb:KYW laser mode-locked by a saturable absorbing mirror, with output pulses of the laser coupled to a length of passive single mode fiber to increase spectral bandwidth of the pulses, a pulse compressor for shortening the duration of the pulses to about 100 fs or less, an optically nonlinear crystal arranged to frequency double the compressed pulses, and an OPO pumped by the frequency-doubled compressed pulses and arranged to generate 100 fs pulses tunable over the spectral range characteristic of a Ti:Sapphire laser.

Continuing with reference to the drawings, wherein like components are designated by like reference numerals, FIG. 2 schematically illustrates one preferred embodiment 10 of tunable ultrafast laser apparatus in accordance with the present invention. Apparatus 10 includes a mode-locked thin-disk solid state laser 12 having a resonator 13 terminated by a saturable semiconductor mirror 14 on a substrate 16 and a concave output-coupling mirror 18. Laser 12 includes a thin-disk solid state gain-medium 20 having a highly reflective mirror backing 22 in thermal contact with a heat sink 24. The mirror backing serves as a fold mirror for resonator 13.

Pump radiation from a diode-laser or a diode-laser array is directed into the gain-medium through the surface thereof opposite the backing mirror. The combination of energizing of the gain medium by the pump radiation and saturable semiconductor mirror 14, causes mode-locked pulsed operation of the laser at a pulse repetition frequency (PRF) determined by the round-trip time in resonator 13.

Gain medium 20 is a Yb-doped solid-state gain-medium. One preferred gain medium is Yb:KYW, however, any other Yb-doped gain medium including Yb:YAG, Yb:KGW, Yb:KLuW, Yb:Lu$_2$O$_3$, Yb:LuScO$_3$ can be used. Circulating fundamental pulsed radiation is indicated by arrowheads F. Mirror 18 is partially-reflective and partially-transmissive at fundamental wavelength for delivering pulses out of resonator 13. Depending on the gain material used, the pulses will have a natural center fundamental wavelength in a range between about 1025 nm and 1040 nm and a spectral bandwidth of up to about 10 nm. By way of example, a natural fundamental wavelength in this range for Yb:KYW is 1028 nm. Pulse duration will be between 200 and 400 femtoseconds. Anticipated average power in the mode-locked pulses for a resonator having a length of 1.875 meters, with a pump-power into the gain-medium of about 40 W is about 10 W at a PRF of about 80 MHz.

Pumping of the gain-medium is depicted in basic form in FIG. 2 for convenience of illustration. Pump radiation preferably has a wavelength of about 940 nm or about 976 nm. Several thin-disk pumping schemes are well-known in the art. These include non-coaxial multi-pass pumping and coaxial multi-pass pumping. These and any other pumping schemes and any Yb-doped gain-medium may be used without departing from the spirit and scope of the present invention. (See, for example, U.S. Pat. Nos. 5,553,088 and 6,778,580, both of which are incorporated herein by reference.)

Continuing with reference to FIG. 2, pulses delivered from laser 12 are focused by a lens 26 into a relatively short length 28 of an optical fiber. Fiber 28 is a passive fiber, i.e., the fiber core is not doped to provide optical gain. The fiber can be a silica or phosphate glass fiber and is preferably a polarization-maintaining (PM) fiber. The purpose of the fiber 28 is to broaden the spectral bandwidth of the pulses by self phase modulation (SPM). For pulses having the average power and duration estimated above at the 80 MHz PRF, a length of fiber of about 10.0 centimeters (cm) will broaden the spectral bandwidth of the pulses to about 30.0 nm. The spectral broadening occurs without a significant loss of average power. Another passive spectral broadening element such as a photonic crystal fiber or a slab waveguide may be used in place of fiber 28.

Spectrally broadened pulses delivered from fiber 28 are collimated by a lens 30 and delivered to a pulse-compressor 32. Pulses having a duration of 300 fs or less after compression are desired. The spectral broadening increases the amount of compression possible compared with that of pulses having the original 10.0 nm bandwidth. A grating-pair pulse-compressor is preferred for compressor 32. This and other pulse compressor types are well known in the art and a detailed description thereof is not necessary for understanding principles of the present invention. Accordingly, such a detailed description is not presented herein.

Such a pulse-compressor is typically able to temporally compress 400-fs pulses to a duration of about 100 fs. The pulse-compression does not occur without loss of power. A reduction of average power from the exemplary 10.0 W to about 7.0 W can be expected as a result of the pulse-compression. This is due primarily to less-than-100% diffraction efficiency of gratings in the grating pair. The temporal pulse compression does, however, result in an increase in peak power of the compressed pulses despite the average-power loss. This is important in the next stage of operation of the inventive laser apparatus.

In this next stage of operation, pulses compressed by pulse-compressor 32 are delivered to an optically non-linear crystal 34 arranged for second-harmonic generation (SHG). Crystal 34 converts a portion of fundamental radiation in the pulses into second-harmonic radiation having a frequency twice that of the fundamental radiation and, accordingly, a wavelength one-half that of the fundamental wavelength radiation. Accordingly the second harmonic radiation will have a wavelength between about 510 nm and 520 nm. A crystal of BiBO is preferred for crystal 34 due to its relatively wide spectral acceptance bandwidth. However, this not be considered as limiting the present invention to any particular optically non-linear crystals.

The efficiency of second-harmonic generation for any particular optically nonlinear crystal is directly dependent on the peak power (intensity) of radiation being converted. Accordingly, compressing the duration of the mode-locked pulses (with the attendant increase in peak power thereof) at this point in the inventive laser to the desired final duration of the pulses to be delivered by the laser improves the efficiency of the SHG process in crystal 34.

It is estimated that the exemplary 7.0 W of average power of fundamental radiation input into crystal 34 will result in a SHG average-power output of about 3 W. The second-harmonic radiation is designated in FIG. 2 by double arrowheads 2H. For a fundamental wavelength between 1024 nm and 1040 nm, the second-harmonic wavelength will be between about 512 nm and 520 nm. For the exemplary 1028-nm fundamental wavelength the second-harmonic (2H) wavelength will be 514 nm. Residual (unconverted) fundamental radiation is separated from the 2H-radiation by a dichroic mirror 36 and the 2H-radiation is directed into the nonlinear crystals inside the optical parametric oscillator.

Mode-locked laser 12, spectral-broadening fiber 28, pulse compressor 32 and second-harmonic generator provide an optical pump engine for an optical parametric oscillator (OPO) 40. OPO 40 has a traveling-wave unidirectional resonator 41 formed by mirrors 42, 44, 46, and 48 in a "bow-tie" arrangement. Included in resonator 41 between mirrors 42 and 44 is an optically nonlinear crystal 50 arranged for optical parametric generation (OPG). Crystal 50 divides a portion of the 2H radiation into two frequency components each having frequency less than the 2H-frequency, i.e., a wavelength longer than the 2H-wavelength. The sum of the two OPG-frequencies is equal to the 2H-frequency as is known in the art. The shorter and longer of the two OPG-wavelengths are traditionally referred to as the signal-wavelength and idler-wavelength respectively. In terms of power in the two wavelengths, the signal-wavelength is the more powerful. Signal and idler radiation components are designated in FIG. 2 by arrowheads S and L respectively. The signal pulse will have about the same duration as the duration of pulses delivered from the pulse compressor.

Suitable materials for optically nonlinear crystal 50 include barium borate (BBO), bismuth borate (BiBO), lithium borate (LBO), and potassium titanyl phosphate (KTP). Crystal 50 may also be of a periodically poled (PP) material such as PPKTP, strontium lithium tantalate (PPSLT), and periodically poled lithium niobate (PPLN).

The signal and idler wavelengths may be tuned in the case of conventional crystal materials by selectively rotating (tilting) crystal 50 about an axis perpendicular to the beam direction as illustrated schematically in FIG. 2 by arrows T. Tuning may also be accomplished by selectively varying the crystal temperature. Periodically poled material may be provided with a progressively varying poling-period (grating) across the width of the period-poled element such that tuning can be accomplished by translating the element perpendicular to the beam direction in the direction of the grating. All of these tuning methods are known in the art. Accordingly, only one of the methods is depicted to avoid unnecessary repetition of drawings.

Resonator 41 is preferably arranged to be resonant at the signal wavelength and is illustrated, so arranged, in FIG. 2. The resonator may be made double resonant, i.e., resonant for both the signal—an idler-wavelengths, without departing from the spirit and scope of the present invention. In the singly-resonant arrangement of resonator 41, mirror 42, 46, and 48 are each highly reflective for a predetermined range of wavelengths selectable by tuning as described above. Mirror 44 is made partially reflective and partially transmissive at the range of signal wavelengths to allow those wavelengths to be coupled out of the resonator. Mirror 42 is highly transparent for the 2H-radiation. Mirror 44 is highly transparent for the 2H, and idler wavelengths. Idler and residual 2H-radiation is separated from the signal-radiation output by a dichroic mirror 52.

It is particularly important that the round-trip length of resonator 41 is selected such that the round-trip time of a signal-radiation pulse in the resonator is an integer multiple of pulse-repetition period of the 2H-radiation pulses (pump-pulses) input into the resonator. The pulse-repetition period of the 2H-radiation pulses of course is the same as the pulse-repetition period of the mode-locked pulses from the mode-locked laser. Making the round trip time in the OPO resonator equal to an integer multiple of this pulse-repetition period synchronizes the arrival of signal-radiation pulses and pump-pulses in crystal 50. Fine tuning of the resonator length may be accomplished by making one resonator mirrors 46 and 48 selectively movable as indicated in FIG. 2 by arrows A, using a piezo-electric actuator or the like (not shown). This resonator length adjustment may also be used for maintaining the resonator in resonance when the signal wavelength is changed as a result of tuning.

It is estimated that the output power of signal radiation would be about 1 Watt at the PRF of the mode-locked pump-radiation pulses with the pulse duration being about 100 W. A practical tuning range for the signal-wavelength is between about 600 and 1100 nm. By reconfiguring the OPO-resonator output wavelengths may be selected in a range between about 300 and 600 nm. A description of one such reconfiguration is set forth below.

Figure 3:
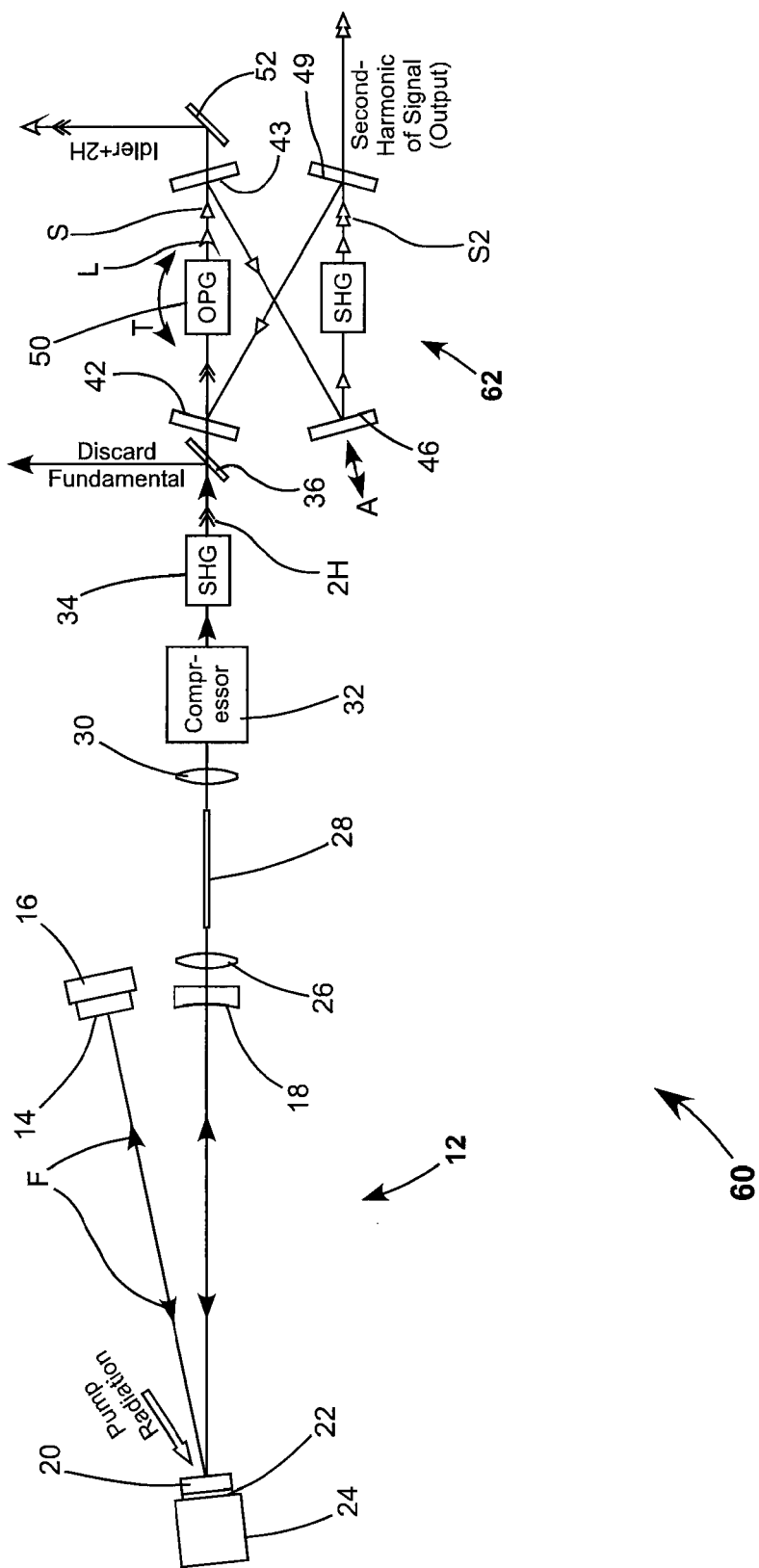
FIG. 3 schematically illustrates another preferred embodiment of an ultrafast laser in accordance with the present invention, similar to the apparatus of FIG. 2 but wherein the OPO includes a second-harmonic generating crystal and delivers output pulses tunable over a wavelength range about one-half the tunable range of the apparatus of FIG. 2

FIG. 3 schematically illustrates another preferred embodiment 60 of laser apparatus in accordance with the present invention. Apparatus 60 is similar to apparatus 10 of FIG. 2 with an exception that OPO 40 of apparatus 10 is replaced by an OPO 62 configured to generate the second-harmonic of the signal radiation for providing the shorter-wavelength tuning range. To this end, the OPO resonator includes an optically nonlinear crystal 64 in addition to OPG crystal 50. In the resonator of OPO 62, mirrors 43 and 49 replace, respectively, mirror 44 and 48 of OPO 40.

Mirror 43 is highly reflective for the signal-wavelength range of tuning but highly transparent for the idler and pump radiations. Mirror 49 is highly reflective for the signal-wavelength range of tuning but highly transparent for the second-harmonic wavelengths of the signal wavelength range (designated by double arrowhead S2) and functions to couple these wavelengths out of the resonator as output of apparatus 60. Mirror 46 is selectively movable as discussed above for tuning and synchronizing the OPO. It estimated that the output power in the shorter-wavelength tuning range will be about the same as that of OPO 40 discussed above.

The SHG crystal inside the OPO may have to be wavelength tuned as the signal wavelength is changing. This can be effected by changing the crystal temperature or in the case of a periodically poled crystals by moving a crystal with a lateral progressively varied poling pitch perpendicular to the beam as discussed above.

Figure 4:
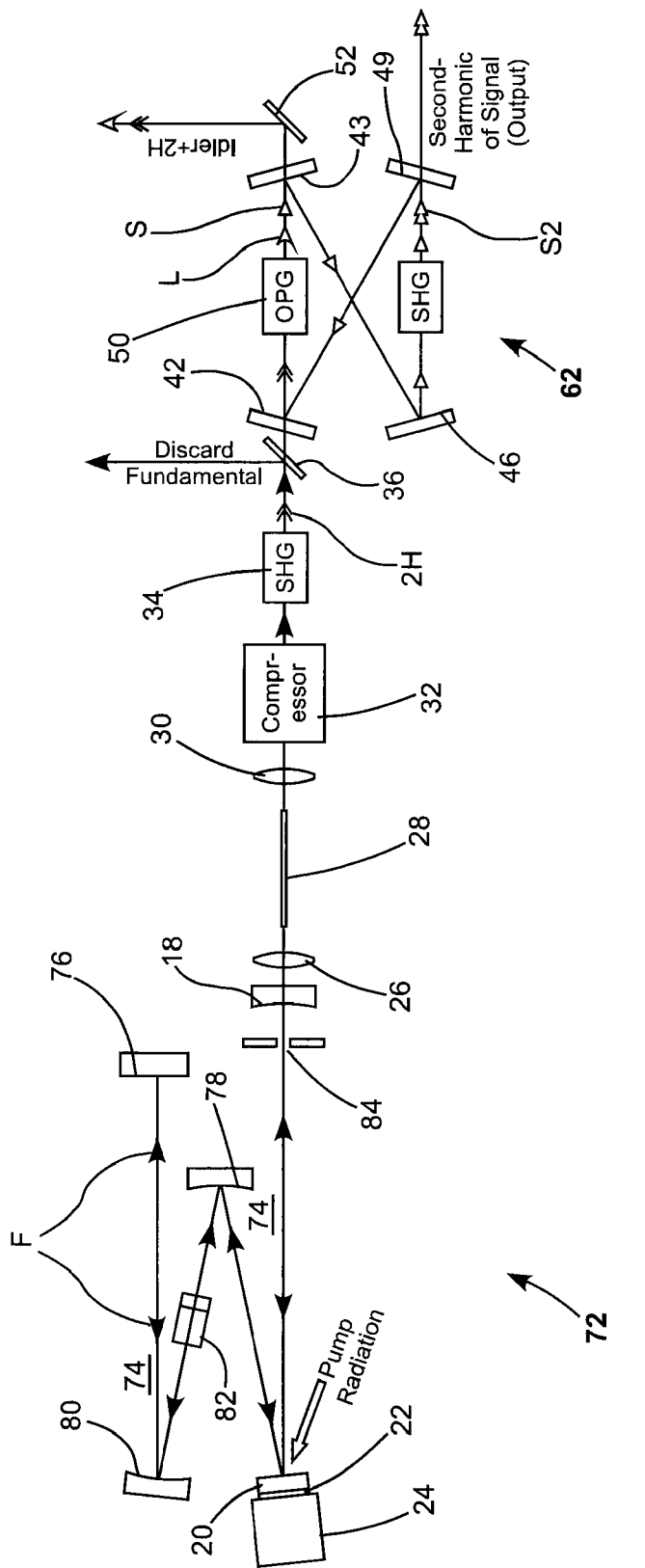
FIG. 4 schematically illustrates yet another preferred embodiment of an ultrafast laser in accordance with the present invention, similar to the laser of FIG. 3 but wherein the pulsed Yb:KYW laser is mode-locked by a Kerr lens mode-locking arrangement.

FIG. 4 schematically illustrates yet another preferred embodiment 70 of laser apparatus in accordance with the present invention. Apparatus 70 is similar to apparatus 60 of FIG. 3 with an exception that mode-locked laser 12 of apparatus 60, which is mode-locked by a SBR is replaced in apparatus 70 by a mode-locked laser 72 which is mode-locked by a Kerr lens mode-locking (KML) arrangement of the type referred to by practitioners of the art as a "hard aperture" KML arrangement.

Laser 72 has a resonator 74 terminated by a highly reflective mirror 76 and output coupling mirror 18. The resonator includes the same thin-disk gain medium arrangement that is used in laser 12 of apparatus 10 and apparatus 60. Resonator 74 is thrice folded, by concave mirrors 78 and 80, and by reflective backing-mirror 22 of gain-medium 20. A Kerr-effect element 82 is located at a beam waist position between mirrors 78 and 80. One suitable element is a fused silica element with Brewster-angled entrance and exit surfaces. Other suitable materials included Sapphire and YAG. This element is cooperative with an aperture 84 adjacent output coupling mirror 18 for providing Kerr lens mode-locking of resonator 74. One of the mirrors may be mounted on a motorized translation stage or a coil-driven or piezo-driven actuator element to provide the starting mechanism for the Kerr lens modelocking. Instead of using a moveable HR mirror, an alternate embodiment may use a saturable absorber mirror instead to start the modelocking mechanism. As Kerr-lens mode-locking is well known to practitioners of the art no further description is presented herein. (See, for example, U.S. Pat. No. 5,079,772, incorporated herein by reference.)

Output characteristics of laser 72 are estimated to be similar to those of laser 12. The output characteristics of apparatus 70 accordingly will be similar to those of apparatus 60. Those skilled in the art will also recognize, without further detailed description or illustration, that laser 72 could be substituted for laser in apparatus 10 without departing from the spirit and scope of the present invention.

The present invention is described above with reference to a preferred and other embodiments. The invention, however, is not limited however to the embodiments described and depicted herein. Rather the invention is limited only by the claims appended hereto.

We claim:

1. Laser apparatus, comprising:
 a mode-locked laser including a ytterbium-doped gain-medium and arranged to deliver mode-locked laser-radiation pulses having a fundamental wavelength, a first spectral bandwidth, and a first pulse-duration and a repetition period;
 an optical element arranged to receive the mode-locked pulses from the mode-locked laser and broaden the spectral bandwidth of the pulses to a second spectral bandwidth;
 a pulse compressor arranged to compress the duration of the bandwidth-broadened pulses to a second duration shorter than the first duration;
 a first optically nonlinear crystal arranged to frequency convert the compressed pulses to provide frequency converted pump pulses; and
 an optical parametric oscillator arranged to be optically pumped by the frequency converted pump pulses, the optical parametric oscillator having a resonator including a second optically nonlinear crystal arranged to frequency-convert the pump pulses to signal-pulses having a wavelength longer than that of the frequency converted pump pulses and tunable within a predetermined range.

2. The apparatus of claim 1, wherein said optical element is a piece of undoped optical fiber.

3. The apparatus of claim 1, further including a third optically nonlinear crystal located in the resonator of the optical parametric oscillator and arranged to frequency convert the signal-pulses, with the frequency converted signal pulses being delivered from the resonator of the optical parametric oscillator as output pulses.

4. The apparatus of claim 1, wherein the gain medium of mode-locked laser is in the form of a thin disk having a reflective coating thereon.

5. The apparatus of claim 1, wherein the mode-locked laser is mode-locked by a saturable Bragg reflector serving as an end mirror in a resonator of the mode-locked laser.

6. The apparatus of claim 1, wherein the mode-locked laser is mode-locked by a hard-aperture Kerr-lens mode-locking arrangement.

7. A method of generating tunable laser pulses comprising the steps of:
 generating mode-locked radiation pulses from a ytterbium-doped gain-medium, said pulses having a fundamental wavelength, a first spectral bandwidth, and a first pulse-duration and a repetition period;
 broadening the spectral bandwidth of the pulses to a second spectral bandwidth;
 compressing the duration of the bandwidth-broadened pulses to a second duration shorter than the first duration;
 frequency converting the compressed pulses in a first optically nonlinear crystal to provide frequency converted pump pulses;
 delivering the frequency converted pulses to an optical parametric oscillator having a second optically nonlinear crystal arranged to be optically pumped by the frequency converted pump pulses; and
 frequency converting the pump pulses into signal pulses in said second optically nonlinear crystal, said signal pulses having a wavelength longer than that of the frequency converted pump pulses and being tunable within a predetermined range.

8. The method of claim 7, wherein the step of broadening the spectral bandwidth of the pulses is performed by transmitting the pulses through a piece of undoped optical fiber.

9. The method of claim 7, further including the step of frequency converting the signal pulses with a third optically nonlinear crystal located within the optical parametric oscillator.

10. The method of claim 7, wherein the gain medium is in the form of a thin disk having a reflective coating thereon.

11. The method of claim 7, wherein the mode-locked pulses are generated using a saturable Bragg reflector.

12. The method of claim 7, wherein the mode-locked pulses are generated using a hard-aperture Kerr-lens mode-locking arrangement.

* * * * *